United States Patent [19]

Laroche

[11] Patent Number: 4,626,124

[45] Date of Patent: Dec. 2, 1986

[54] STRUCTURAL CORNER JOINTS

[76] Inventor: Francois X. Laroche, P.O. Box 1024, Waterloo (Quebec), Canada, J0E 2N0

[21] Appl. No.: 811,277

[22] Filed: Dec. 20, 1985

[51] Int. Cl.⁴ ............................................. F16B 7/00
[52] U.S. Cl. .................................. 403/295; 403/205; 403/297; 403/403
[58] Field of Search ............... 403/403, 381, 295, 297, 403/73, 91, 65, 402, 205

[56] References Cited

U.S. PATENT DOCUMENTS

| 1,817,162 | 8/1931 | Mulligan | 403/293 |
| 3,272,582 | 9/1966 | Anderson et al. | 403/295 X |
| 3,848,390 | 11/1974 | Anderson | 52/758 H |
| 3,866,380 | 2/1975 | Benson | 52/656 |
| 4,251,166 | 2/1981 | Lautenschlager | 403/402 |
| 4,505,609 | 3/1985 | Vella | 403/297 X |

FOREIGN PATENT DOCUMENTS

| 1152852 | 8/1963 | Fed. Rep. of Germany | 403/402 |
| 153065 | 12/1979 | Japan | 403/381 |
| 435654 | 10/1967 | Switzerland | 403/402 |

Primary Examiner—Andrew V. Kundrat
Attorney, Agent, or Firm—Robic, Robic & Associates

[57] ABSTRACT

A structural joint has a pair of elongated members each provided with an elongated groove with an opening narrower than the inside of the groove. A connecting key has a pair of legs configured, in cross-section, like the cross-section of the grooves and slidably fitted each into one of the grooves with side faces of the legs engaging opposed side walls of the grooves. Set screws are threaded through bores of the key legs from the openings of the grooves and up to the bottom of the grooves so that when the screws are tightened, they force the leg side faces into engagement with the side groove opposed side walls to lock the legs into the grooves. The adjacent ends of the legs are articulated to one another.

9 Claims, 8 Drawing Figures

STRUCTURAL CORNER JOINTS

BACKGROUND OF THE INVENTION

1. Field of the invention

The present invention relates to the art of assembling structural members together into a building frame and more particularly a frame wherein elongated frame members are joined together at their ends by means of connecting keys having two legs extending at a predetermined angle to one another and fixed to the frame members to hold the latter according to this predetermined angle, the legs being solid with one another.

2. Description of the related art

In present practice where the angle between the connected structural members is a right angle or even less standard sizes like 45° and 60°, the solid connector key presents no problem and a limited number of connecting keys need be stocked. However, in certain types of building structures such as greenhouses or solariums, wall panels very often meet at angles other than the conventional angles mentioned above and it is necessary, in such cases, to fabricate connecting keys that fit particular situations. This is of course a time consuming, thus costly, procedure apart from the fact that a larger inventory of such parts has to be kept.

Such connecting keys are disclosed in U.S. Pat. Nos. 1,817,162 of 1931; 3,848,390 of 1974; 3,866,380 of 1975; 4,251,166 of 1981. It is seen, from these patents, that the connecting keys therein all involve a pair of legs that are integral with one another and thus serve for only one angular connection. They do not consequently provide any flexibility where frame members are to be joined together at other angles.

SUMMARY OF THE INVENTION

It is therefore a main object of the invention to provide a connecting key suitable to assemble two structural members end to end at any desired angular positions of the members.

Another object of the invention lies in a structural joint between two elongated members particularly configured to receive the legs of the aboveconnecting key with the greatest of ease, the keys being further provided with means, cooperating with the structural members, to lock the members solidly together at any desired angle.

More specifically and according to one aspect of the invention, there is provided a connecting key which comprises a pair of elongated legs and means interconnecting the legs end to end for pivotal movement about an axis transverse thereto. Each leg has, in cross-section, a top face, a bottom face and opposed side faces spaced apart a distance which is greater than the width of the top face. Locking means are provided through the legs and extend between the top face and the bottom face.

According to a further aspect, the invention is a structural joint which comprises: a pair of elongated members, each member having an elongated groove defining an elongated opening narrower than the inside of the groove; a connecting key having a pair of legs configured, in cross-section, like the cross-section of the grooves and slidably fitting each into one of the grooves; wherein side faces of the legs engage opposed side walls of the grooves; means joining adjacent ends of the legs for pivotal movement about an axis transverse to the legs, and means extending through the legs from the groove opening and forcing the engagement of the leg side faces against the side groove opposed side walls to lock the legs into the grooves.

A description of preferred embodiments of the invention now follows.

BRIEF DESCRIPTION OF THE DRAWING

FIG. 5 is a transverse cross-sectional view of a structural member used in a joint according to the invention.

Referring to the drawing, connecting keys 1, such as shown in FIGS. 2 and 3, are used to secure together, at right angles and in three different planes, three structural members A B and C, the end faces of members B and C abutting squarely adjacent side faces of the other member A. FIG. 4, on the other hand, illustrates two structural members D and E forming a mitre joint and secured together by a connecting key 1. The man of the art will readily appreciate that other angular connections are possible between structural members and connecting keys configured according to the present invention and as now to be fully described.

Figures 2, 3:
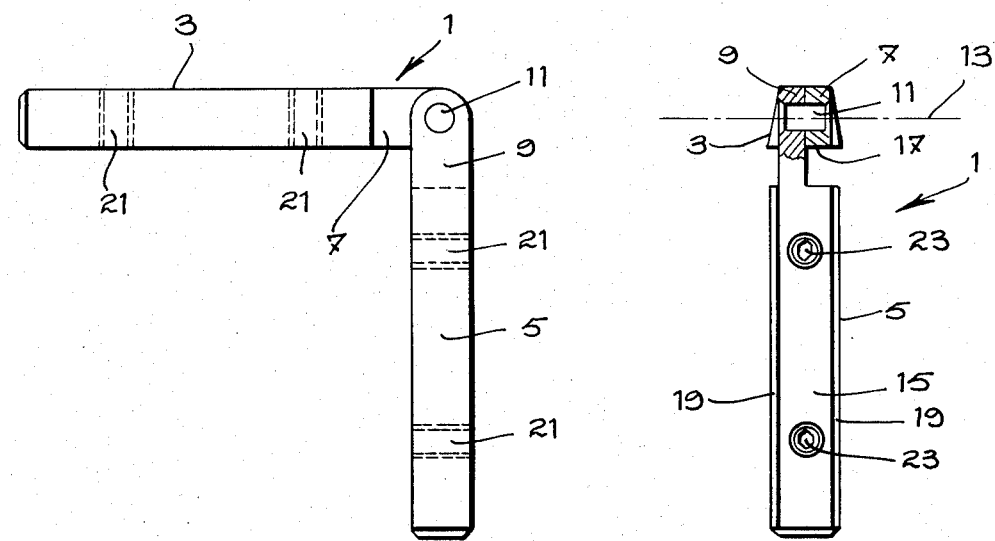
FIGS. 2 and 3 are, respectively, a side elevation view and an end view of a connecting key according to the invention.
Figure 3:
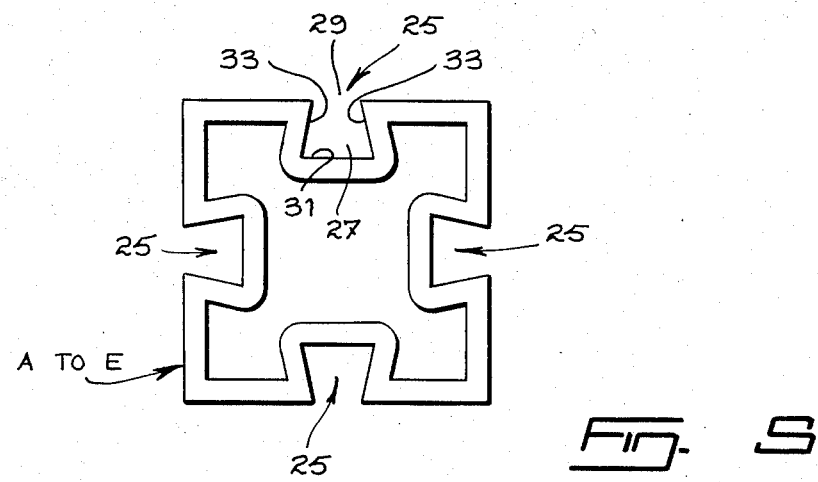

The connecting key shown in FIGS. 2 and 3 comprises a pair of elongated legs 3 and 5 respectively formed with integral lugs 7 and 9, projecting from one of their ends. It will be seen, in FIG. 3, that the lugs 7 and 9 lie on either side of a central plane common to both legs 3 and 5. The lugs 7 and 9 are interconnected, in any known manner, by a pivot pin 11 so as to allow free rotational movement about an axis 13 normal to both the lugs 7 and 9 and of course normal to the legs 3 and 5. From this description, it will be appreciated that the legs 3 and 5 are advantageously identical to one another.

When seen in cross-section, as at the top of FIG. 3, each leg 3, 5, has a top face 15, a bottom face 17 and opposed side faces 19 which are spaced apart a distance greater than the width of the top face 15.

Locking means are used to secure the legs 3 and 5 to the structural members A to E. The locking means illustrated comprise threaded bores 21, through the legs 3 and 5, and set screws 23 of the allen type, that is with a hexagonal recess at the top.

In cross-section, the connecting key 1 of FIGS. 2 and 3 forms an isosceles trapezium.

The key of FIGS. 2 and 3 is for use with structural members A to E which are identical in cross-section and are illustrated in FIG. 5. These members are hollow and made of extruded aluminum, being generally rectangular (square being a particular case) in cross-section. Each of the four sides of the rectangle is formed with a groove 25, all grooves being identical. From FIGS. 1 and 4, it will be appreciated that the elongated grooves 25 extend fully lengthwise of the members A to E and, in assembled condition, one groove 25 of one member communicates with one groove 25 of the other member. In fact, if a firm and steady connection between two members is required, at least two grooves 25 of one member must communicate with two grooves 25 of the other member as is readily apparent from FIGS. 1 and 4.

Figure 6:
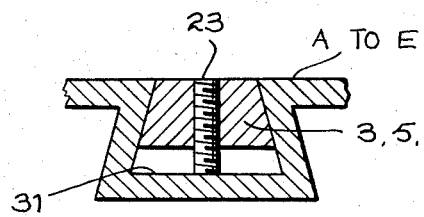
FIGS. 6, 7 and 8 are partial cross-sectional views of joints of the invention according to three embodiments thereof.

Each groove 25 forms a housing 27 having a top opening 29, a bottom wall 31 facing the opening 29 and opposed side walls 33 joining the opening 29 and the bottom wall 31. The housing 27 thus has the form of a trapezium, the same as the cross-section of the legs 3 and 5. As best shown in FIG. 6, the latter legs 3 and 5 slidably fit into respective housings 27 of the members A to E, their thickness being slightly smaller than the depth of the housing 27. Thus, and as again shown in FIG. 6, tightening of the screws 23 against the bottom walls 31 of the housings 27 forcibly applies the side faces 19 of the key legs 3 and 5 against the side walls 33 of the housings 27. In this manner, with the key legs 3 and 5 fast in their respective grooves 25 and with at least two keys 1 being used for two interconnected members, the latter can be secured against rotation at the selected angle.

Figure 1:
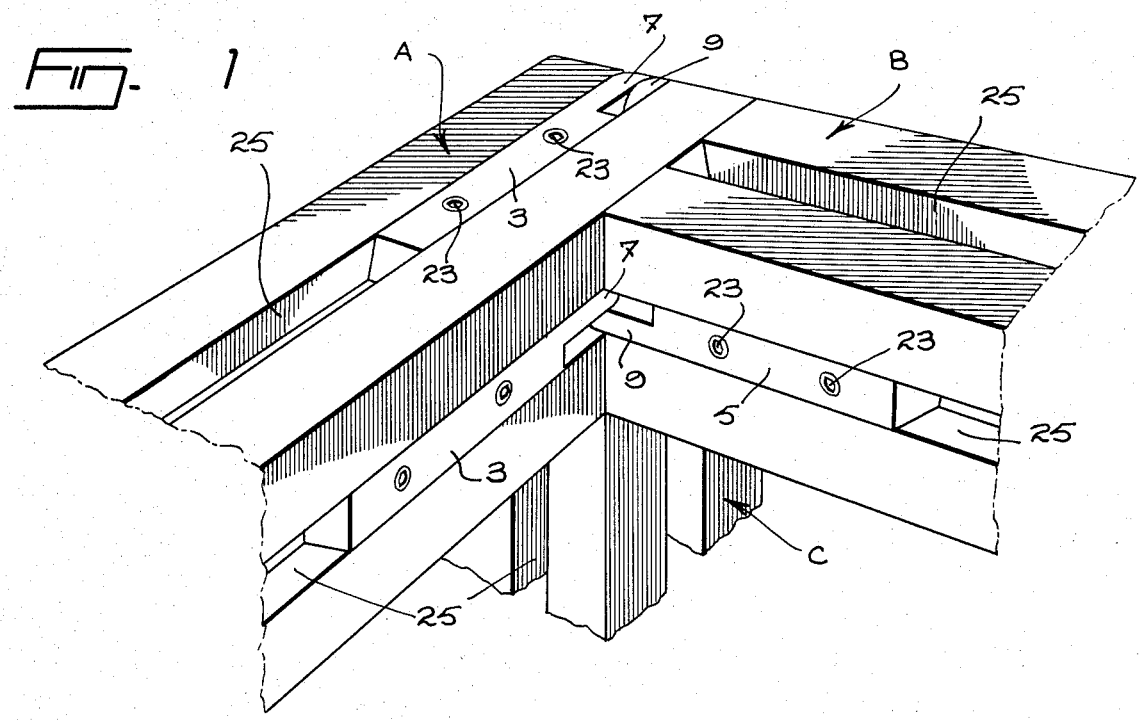
FIG. 1 is a perspective view of a structural joint made according to the invention and involving three structural members.
Figure 4:
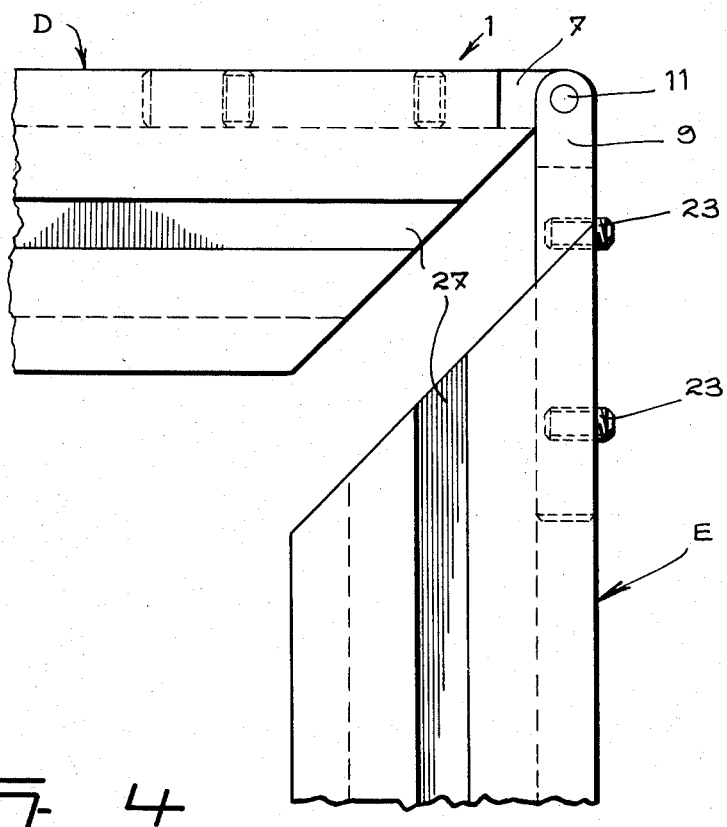
FIG. 4 is a side elevation view of a mitered structural joint, according to the invention, about to be completed.

Indeed, while FIGS. 1 and 4 illustrate structural members A to E being connected at right angles or normal to one another, it will be appreciated that, because of the pivotable interconnection between the legs 3 and 5 of each key 1, any other angle between structural members can be selected provided of course that the adjacent faces between the members to be connected are properly mitred at the desired angle. Conclusively, only one type of key 1 is necessary for any desired angular connection.

From the above description, it will be appreciated that the principle of the invention applied here is that the elongated groove 25 defines an elongated opening 29 which is narrower than the inside of the housing 27 defined by the groove 25. Similarly, the legs 3 and 5 of each key 1 has to be configured, in cross-section, like the cross-section of the housing 27. With this in mind, the legs 3' 5' may be rounded in cross-section with a flat top as shown in FIG. 6. In this case of course the housing 27' of the corresponding members A' to E' must be likewise arcuate.

Figure 7:
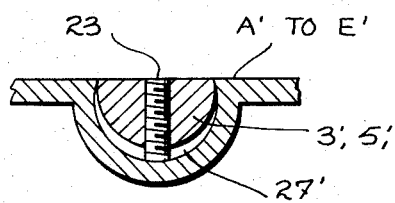

Alternatively, and as shown in FIG. 7, the key legs 3" and 5" may have the shape of an inverted T, the housing 27" then having horizontal side wall portions 35 intended to receive the horizontal bar of the T shape.

Figure 8:
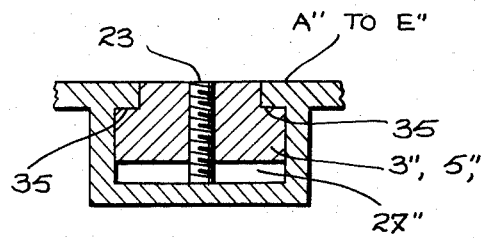

The principle applied in the variants of the invention illustrated in FIGS. 7 and 8 is therefore the same as that applied in the embodiment of FIG. 6.

I claim:

1. A structural joint comprising:
   (a) a pair of elongated members, each member being rectangular in cross-section and having four sides each provided with an elongated groove extending lengthwise thereof, said members being arranged so that the grooves of one member communicate with the grooves of the other member;
   (b) each of said grooves defining, in cross-section, a housing having a top opening, a bottom wall and opposed side walls spaced apart a distance greater than said top opening;
   (c) a connecting key comprising:
      a pair of elongated legs, each leg having, in cross-section, a top face, a bottom face and opposed side faces spaced apart a distance greater than said top face; said legs being slidably fitted into a pair of communicating housings with the side faces thereof engaging the side walls of the grooves defining said housings; and
      means interconnecting said legs end to end for pivotal movement about an axis transverse to said legs,
   (d) locking means through the legs of said connecting key, including screws pressed against the bottom walls of said grooves for forcing said side faces of said legs against said side walls of said grooves thereby to lock said legs into said grooves,
   (e) at least one additional connector having the same structure as described in paragraph (c), the legs of said additional connector key being slidably fitted into another pair of communicating housings, and
   (f) additional locking means having the same structure as described in paragraph (d), said additional locking means cooperating with said additional connector key for locking said additional connector key into the two further grooves defined by said other pair of housings communicating with one another.

2. A structural joint as claimed in claim 1, wherein said cross-sections of said grooves and legs form isosceles trapezium.

3. A structural joint as claimed in claim 2, wherein said legs are formed with threaded bores extending completely therethrough between a top face and a bottom face thereof, said locking means being screws threaded into said bores.

4. A structural joint as claimed in claim 3, wherein said means pivotally interconnecting said legs end to end comprise: lugs projecting axially from said legs on one side of the longitudinal axis thereof and pivot means interconnecting said projecting lugs at the free ends thereof.

5. A structural joint as claimed in claim 1, wherein each leg has an inverted T-shape in cross-section.

6. A structural joint as claimed in claim 5, wherein said legs are formed with threaded bores extending completely therethrough between a top face and a bottom face thereof, said locking means being screws threaded into said bores.

7. A structural joint as claimed in claim 1, wherein said means pivotally interconnecting said legs end to end comprise: lugs projecting axially from said legs on one side of the longitudinal axis thereof and pivot means interconnecting said projecting lugs at the free ends threof.

8. A structural joint as claimed in claim 1, wherein the top faces of said grooves and legs are flat and their side faces and bottom faces together form an arcuate surface starting from said top face.

9. A structural joint as claimed in claim 8, wherein said legs are formed with threaded bores extending completely therethrough between a top face and a bottom face thereof, said locking means being screws threaded into said bores.

* * * * *